United States Patent [19]

Katsuta et al.

[11] Patent Number: 4,972,502
[45] Date of Patent: Nov. 20, 1990

[54] IMAGE SIGNAL BINARY ENCODER

[75] Inventors: Yuji Katsuta; Hiroshi Kamada, both of Yamatokoriyama, Japan

[73] Assignee: Sharp Kabushiki Kaisha, Osaka, Japan

[21] Appl. No.: 156,665

[22] Filed: Feb. 17, 1988

[30] Foreign Application Priority Data

| Feb. 17, 1987 | [JP] | Japan | 62-34917 |
| Feb. 17, 1987 | [JP] | Japan | 62-34918 |
| Jul. 27, 1987 | [JP] | Japan | 62-188141 |
| Jul. 27, 1987 | [JP] | Japan | 62-188142 |

[51] Int. Cl.$^5$ .............................................. G06K 9/00
[52] U.S. Cl. ........................................ 382/56; 382/52; 358/456; 358/457
[58] Field of Search ............................ 382/52, 56, 27; 358/282, 283, 456, 464, 457

[56] References Cited

U.S. PATENT DOCUMENTS

| 4,542,527 | 9/1985 | Tsunekawa | 382/52 |
| 4,551,768 | 11/1985 | Tsuchiya et al. | 382/56 |
| 4,667,237 | 5/1987 | Yokomizo | 358/282 |
| 4,710,822 | 12/1987 | Matsunawa | 358/282 |
| 4,723,173 | 2/1988 | Tanoika | 358/457 |
| 4,723,298 | 2/1988 | Schiller | 382/56 |
| 4,729,035 | 3/1988 | Tanoika | 358/282 |
| 4,734,784 | 3/1988 | Tanaka | 358/456 |
| 4,831,658 | 5/1989 | Umeda et al. | 382/52 |
| 4,853,792 | 8/1989 | Katsuta et al. | 382/52 |

Primary Examiner—David K. Moore
Assistant Examiner—Yon Jung

[57] ABSTRACT

An image signal binary encoder for converting analog image signals into binary output signals, including an arithmetic circuit which calculates, when a predetermined area of a matrix having m rows and n columns and containing mxn points $P_{a,b}$ ($a=i,\ldots,i\text{-}m+1$; $b=j,\ldots,j-n+1$) is given so as to be enclosed by the points $P_{i,j}$, $P_{i-m+1,j}$, $P_{i,j-n+1}$ and $P_{i\text{-}m+1,j-n+1}$ where characters i, j, m and n denote natural numbers, respectively, an average of densities of the mxn points $P_{a,b}$ by calculating, on the supposition that characters $x_{a,b}$ denote the densities of the mxn points $P_{a,b}$, respectively, a sum $s_{i,j}$ of n values from $x_{i,j}$ to $x_{i,j-n+1}$ by the equation: $s_{i,j}=s_{i,j-1}+x_{i,j}-x_{i,j-n}$ and calcuting a sum $S_{i,j}$ of m values from $s_{i,j}$ to $s_{i-m+1,j}$ by the equation: $S_{i,j}=S_{i-1,j}+s_{i,j}-s_{i-m,j}$ and calculating an average $A_{i,j}$ of mxn values from $x_{i,j}$ to $x_{i-m+1,j-n+1}$ by the equation: $A_{i,j}=S_{i,j}/(mxn)$ such that the analog image signals are converted into the binary output signals by using the average $A_{i,j}$ obtained by the arithmetic circuit.

10 Claims, 6 Drawing Sheets

IMAGE SIGNAL BINARY ENCODER

BACKGROUND OF THE INVENTION

The present invention relates to an image signal binary encoder for converting analog image signals into binary output signals.

Conventionally, in the case where contents of an original document are converted into image signals of two gradations, it has been a general practice that in order to rapidly perform arithmetic operation for calculating an average density of a predetermined area, a number of adders are operated concurrently so as to obtain a sum of respective digital density data of sections of the predetermined area and then, the average density is obtained by dividing the sum by the number of the sections.

However, this known arithmetic operation method has such a drawback that the number of the adders is required to be increased further as the number of the digital density data of the predetermined area becomes larger.

SUMMARY OF THE INVENTION

Accordingly, an essential object of the present invention is to provide, with a view to eliminating the above described disadvantage of the prior art arithmetic operation method, an image signal binary encoder which is capable of converting analog image signals into binary output signals by calculating an average of densities of sections of a predetermined area on a real-time basis, i.e. through sequential data processing without the need for increasing the number of adders even if the number of respective digital density data of the sections of the predetermined area becomes larger.

In order to accomplish this object of the present invention, an image signal binary encoder for converting analog image signals into binary output signals, embodying the present invention comprises an arithmetic means which calculates, when a predetermined area of a matrix having m rows and n columns and containing mxn points $P_{a,b}$ (a= i,---, i−m+1; b=j,---, j−n+1) is given so as to be enclosed by the points $P_{i,j}$, $P_{i-m+1, j}$, $P_{i, j-n+1}$ and $P_{i-m+1, j-n+1}$ where characters i, j, m and n denote natural numbers, respectively, an average of densities of the mxn points $P_{a,b}$ by calculating, on the supposition that characters $x_{a,b}$ denote the densities of the mxn points $P_{a,b'}$ respectively, a sum $s_{i,j}$ of n values from $x_{i,j}$ to $x_{i, j-n+1}$ by the equation: $s_{i,j} = s_{i, j-1} + x_{i,j} - x_{i, j-n}$ and calculating a sum $S_{i,j}$ of m values from $s_{i,j}$ to $s_{i-m+1, j}$ by the equation: $S_{i,j} = S_{i-1, j} + s_{i,j} - s_{i-m, j}$ and calculating an average $A_{i,j}$ of mxn values from $x_{i,j}$ to $x_{i-m+1, j-n+1}$ by the equation: $A_{i,j} = S_{i,j}/(m \times n)$ such that the analog image signals are converted into the binary output signals by using the average $A_{i,j}$ obtained by said arithmetic means.

In the image signal binary encoder of the present invention, even if the number of digital density data in the predetermined area becomes larger, it becomes possible to obtain an average density in the predetermined area on a real-time basis without the need for increasing the number of the adders. Furthermore, in the image signal binary encoder of the present invention, the image signals can be converted into the binary output signals by using the average density.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
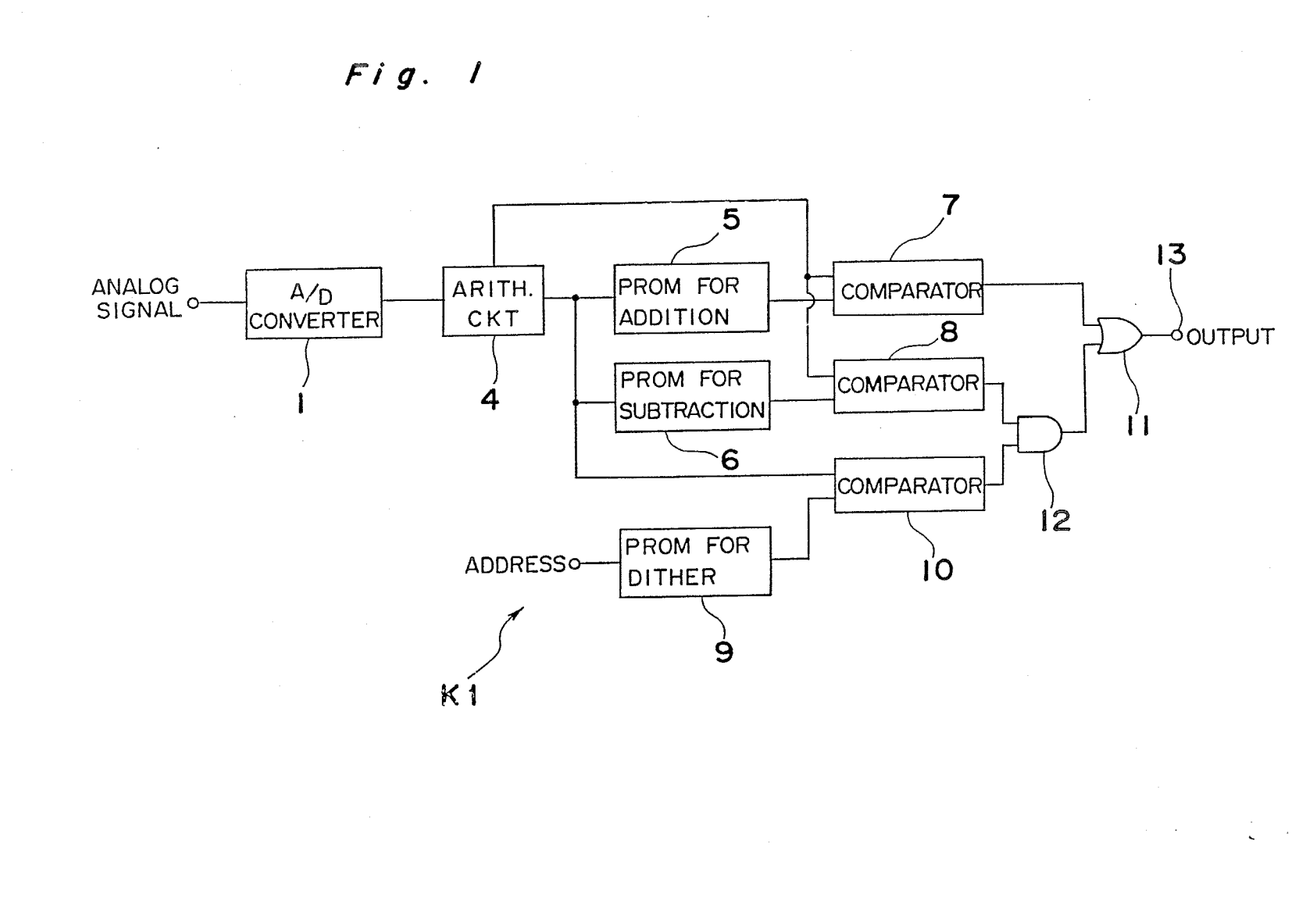
FIG. 1 is a block diagram showing a basic structure of an image signal binary encoder according to a first embodiment of the present invention.

Referring now to the drawings, there is shown in FIG. 1, an image signal binary encoder K1 according to a first embodiment of the present invention. The image signal binary encoder K1 includes an A/D (analog to digital) converter 1 for converting analog video signals of a predetermined area of an image of an original document into 8-bit digital data, an arithmetic circuit 4 for calculating an average density of the predetermined area, a PROM (programmable read-only memory) 5 for addition, a PROM 6 for subtraction, a PROM 9 for dither, comparators 7, 8 and 10, an AND circuit 12 and an OR circuit 11.

As the digital data converted by the A/D converter 1 have larger values, density of the image of the original document becomes greater. From digital data of 8×8 points with a point for binary conversion being substantially set at a center of the 8×8 points, the arithmetic circuit 4 calculates an average of densities of points in the predetermined area and data of the point for binary conversion. When the average of the densities is applied as address data from the arithmetic circuit 4 to the PROM 5 for addition, the PROM 5 for addition outputs a value obtained by adding a predetermined value to the average of densities. Meanwhile, when the average of densities is inputted as address data from the arithmetic circuit 4 to the PROM 6 for subtraction, the PROM 6 for subtraction outputs a value obtained by subtracting a predetermined value from the average of densities.

The comparator 7 compares data of the point for binary conversion with data outputted by the PROM 5 for addition and outputs "1" when the former is larger than the latter. The comparator 8 compares data of the point for binary conversion with data outputted by the PROM 6 for subtraction and outputs "0" and "1" when the former is smaller than and larger than the latter, respectively. The PROM 9 for dither uses 2 bits of given address data so as to select a dither type and uses the remaining 6 bits so as to select a point in an 8×8 dither pattern. The comparator 10 compares data outputted by the PROM 9 for dither with the average of densities from the arithmetic circuit 4 and outputs binary data obtained by converting the average density by dither method. An output of the comparator 7 is applied to the OR circuit 11. Outputs of the comparators 8 and 10 are applied to the AND circuit 12 whose output is delivered to the OR circuit 11. An output of the OR circuit 11 is generated at an output terminal 13 of the image signal binary encoder K1.

When a density of the point for binary conversion is larger than a value obtained by adding a predetermined value to an average of densities of a periphery of the point for binary conversion, the comparator 7 outputs "1" and thus, an output at the output terminal 13 assumes "1". Meanwhile, when the density of the point for binary conversion is smaller than a value obtained by subtracting a predetermined value from the average of densities of the periphery of the point for binary conversion, the comparators 7 and 8 output "0" and thus, an output at the output terminal 13 assumes "0". Namely, in the case of an image of two gradations such as characters, in which a density of the point for binary conversion is quite different from an average of densities of the periphery of the point for binary conversion, an output "1" or "0" is forcibly produced at the output terminal 13.

Meanwhile, when the density of the point for binary conversion is not only smaller than the value obtained by adding the predetermined value to the average of densities of the periphery of the point for binary conversion but greater than the value obtained by subtracting the predetermined value from the average of densities of the periphery of the point for binary conversion, the comparator 7 outputs "0" and the comparator 8 outputs "1". The binary data into which the average density is converted by dither method is outputted from the comparator 10 to the output terminal 13 through the AND circuit 12 and the OR circuit 11. Namely, in the case of an image of multiple gradations such as photographs, in which a density of the point for binary conversion is approximate to an average of densities of the periphery of the point for binary conversion, binary data corresponding to the average of densities of the periphery of the point for binary conversion is produced at the output terminal 13.

Hereinbelow, a structure of the arithmetic circuit 4 characteristic of the present invention is described in detail. The arithmetic circuit 4 calculates data of the point for binary conversion and the average of densities of points in the predetermined area. It is supposed here that a matrix having m rows and n columns and containing mxn points $P_{a,b}$ (a=i,---, i−m+1; b=j,---, j−n+1) is given as the predetermined area so as to be enclosed by the points $P_{i,j}$, $P_{i-m+1,j}$, $P_{i,j-n+1}$ and $P_{i-m+1,j-n+1}$ where characters i, j, m and n denote natural numbers, respectively. On the supposition that characters $x_{a,b}$ denote densities of the mxn points $P_{a,b}$, respectively, a sum $s_{i,j}$ of n values from $x_{i,j}$ to $x_{i,j-n+1}$ is calculated by the following equation (1).

$$s_{i,j} = s_{i,j-1} + x_{i,j} - x_{i,j-n} \quad (1)$$

Then, a sum $S_{i,j}$ of m values from $s_{i,j}$ to $s_{i-m+1,j}$ is calculated by the following equation (2).

Then, an average $A_{i,j}$ of mxn values from $x_{i,j}$ to $x_{i-m+1,j-n+1}$ is calculated by the following equation (3).

$$A_{i,j} = S_{i,j}/(mxn) \quad (3)$$

Thus, the average of densities of points in the predetermined area is given by the average $A_{i,j}$ of the equation (3).

Figure 2:
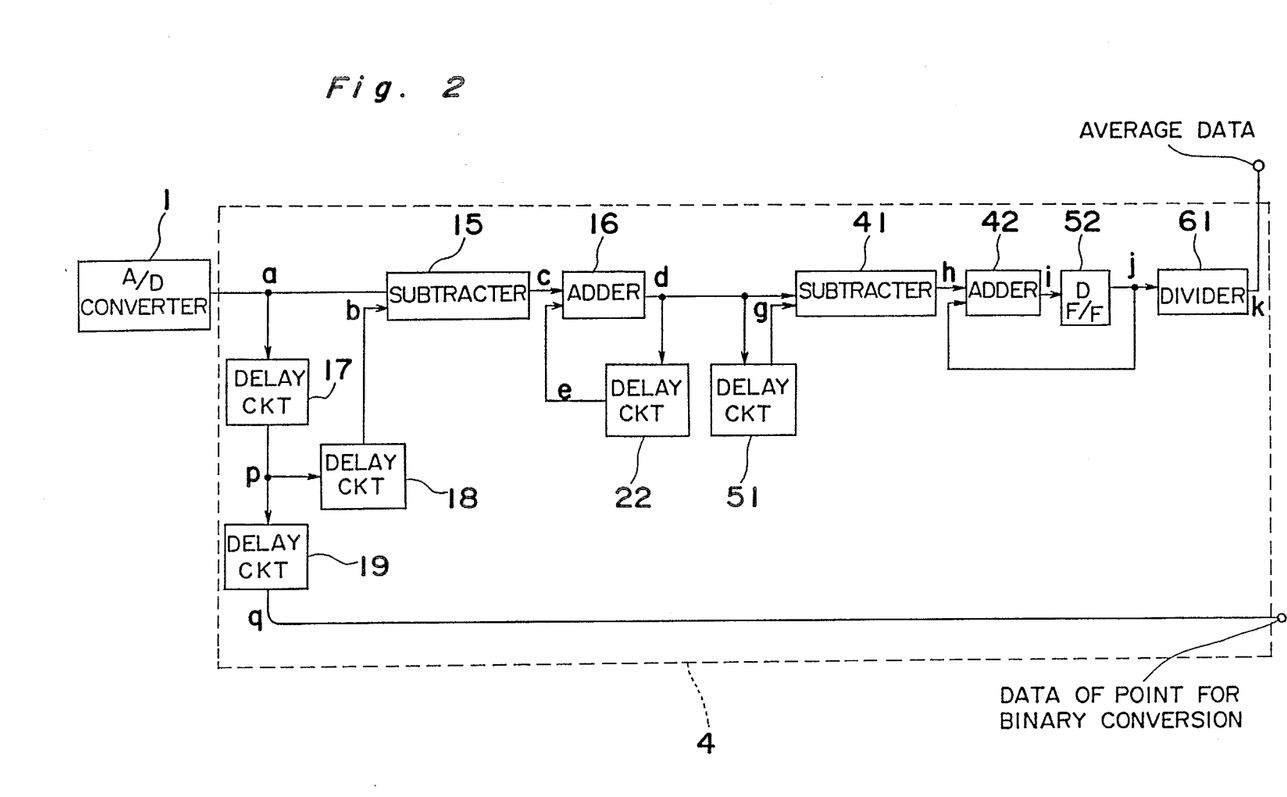
FIG. 2 is a block diagram of an arithmetic circuit employed in the image signal binary encoder of FIG. 1.

An example in which the arithmetic circuit 4 outputs, from digital data of an 8×8 matrix, the average of densities of points in the predetermined area and data of the point for binary conversion is described with reference to FIG. 2, hereinbelow. Initially, the data of the point for binary conversion is obtained as follows. Namely, data a from the A/D converter 1 is subjected to a delay of 4 lines into data p by a delay circuit 17. Then, in order to locate the point for binary conversion substantially at the center of the 8×8 matrix, the data p is further subjected to a delay of 3 lines into data q by a delay circuit 19 so as to be outputted to the PROM 5 for addition, the PROM 6 for subtraction and the comparator 10.

Meanwhile, the average of densities is obtained as follows. Namely, the data a from the A/D converter 1 is subjected to a delay of 4 lines into the data p by the delay circuit 17 and the data p is further subjected to a delay of 4 lines into data b by a delay circuit 18. The data b is subtracted from the data a by a subtractor 15 so as to obtain data c. Output data d of an adder 16 is subjected to a delay of 1 line into data e by a delay circuit 22. The data e and the data c are added to each other in the adder 16 to obtain data d. The output data d from the adder 16 is a sum of 8 values each having 8 bits. The output data d corresponds to completion of calculation up to the equation (1) and has 11 bits. Subsequently, the data d is subjected to a delay of 8 lines by a delay circuit 51 in order to obtain data g. Then, the data g is subtracted from the data d by a subtractor 41 so as to obtain data h.

Output data i from an adder 42 is latched into data j by a D flip-flop 52 and the data j and the data h are added to each other by the adder 42 to obtain the data i. The output data j from the D flip-flop 52 is a sum of 8 values d each having 11 bits, which data d is outputted by the adder 6. The output data j from the D flip-flop 52 corresponds to completion of calculation up to the equation (2) and has 14 bits.

Subsequently, the data j is divided by 64 in a divider 61 so as to obtain data k as average data and thus, calculation up to the equation (3) is completed. The data k is outputted to the comparators 7 and 8. Since 64 is a power of 2, the divider 61 can be arranged to output the leading 8 bits of the 14-bit data j.

Figure 3:
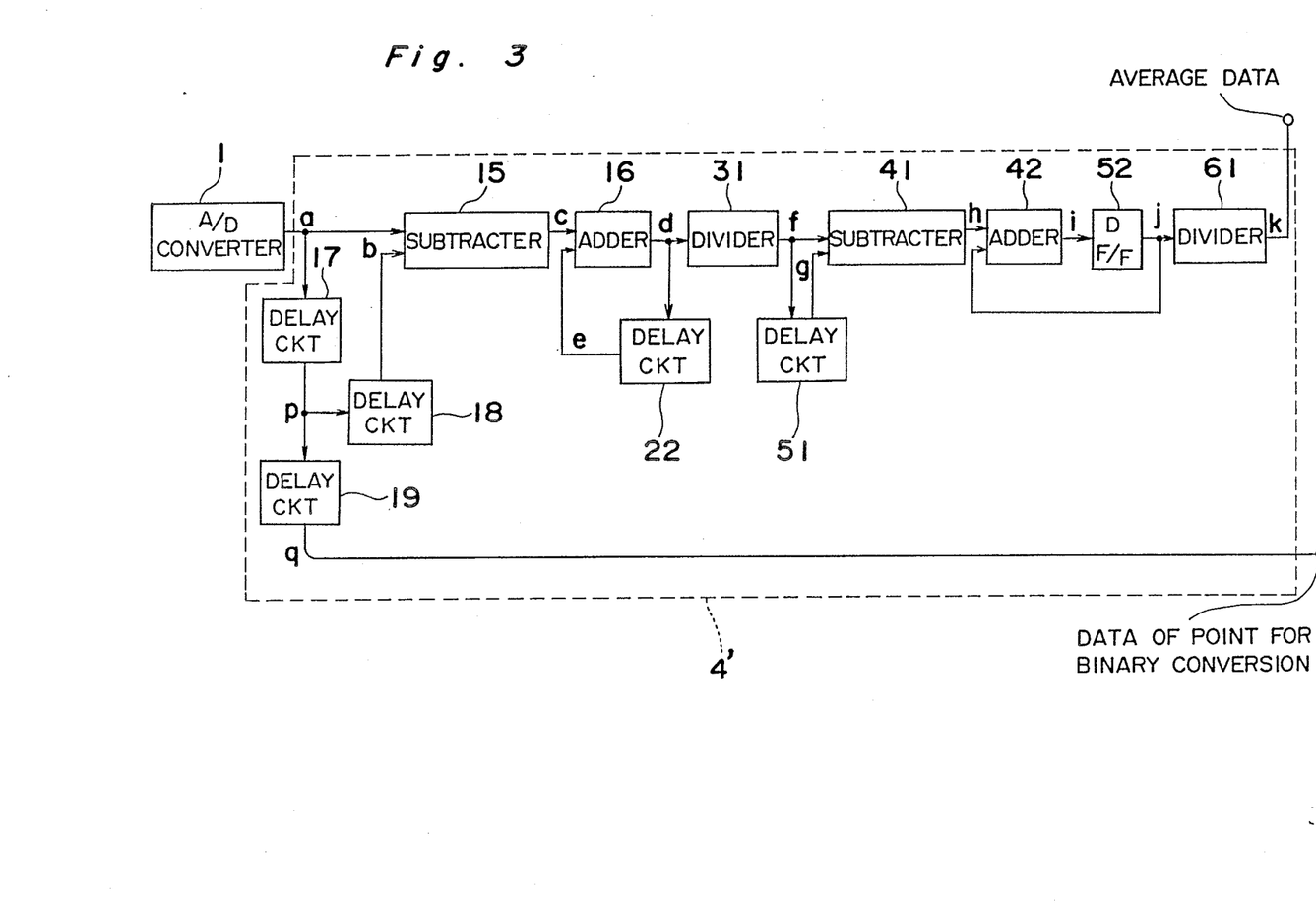
FIG. 3 is a view similar to FIG. 2, particularly showing a modification thereof.

Hereinbelow, an arithmetic circuit 4', which is a modification of the arithmetic circuit 4, is described with reference to FIG. 3. In the modified arithmetic circuit 4', the sum $s_{i,j}$ is obtained by the equation (1) referred to earlier in the same manner as the arithmetic circuit 4. Then, a value $V_{i,j}$ of division of a sum of m values from $s_{i,j}$ to $s_{i-m+1,j}$ by m is given by the following equation (2').

$$V_{i,j} = V_{i-1,j} + s_{i,j}/n - s_{i-m,j}/n \quad (2')$$

Subsequently, an average $A_{i,j}$ of mxn values from $x_{i,j}$ to $x_{i-m+1,j-n+1}$ is given by the following equation (3').

$$A_{i,j} = V_{i,j}/m \quad (3')$$

It is to be noted that the arithmetic circuit 4' is different from the arithmetic circuit 4 only in that a divider 31 is added between the adder 16 and the subtractor 41 in the arithmetic circuit 4'. Therefore, an example in which the arithmetic circuit 4' calculates, from digital data of an 8×8 matrix, the average of densities of points in the predetermined area and data of the point for binary conversion is described briefly, especially in connection with differences therebetween for the sake of brevity. The data d from the adder 16 is divided by 8 to obtain data f in the divider 31. Since 8 is a power of 2, the divider 31 can be arranged to output the leading 8 bits of the 11-bit data d. Subsequently, the data f is subjected to a delay of 8 lines into data g by the delay circuit 51. Meanwhile, the output data j from the D flip-flop 52 is a sum of 8 values f each having 8 bits, which data f is outputted by the divider 31. The output data j corresponds to completion of calculation up to the equation (2') and has 11 bits. Subsequently, the data j is divided by 8 in the divider 61 so as to obtain data k as the average data and thus, the calculation up to the equation (3') is completed. The data k is outputted to the comparators 7 and 8. In the same manner as the divider 31, since 8 is a power of 2, the divider 64 can also be arranged to output leading 8 bits of the 11-bit data j.

Figure 4:
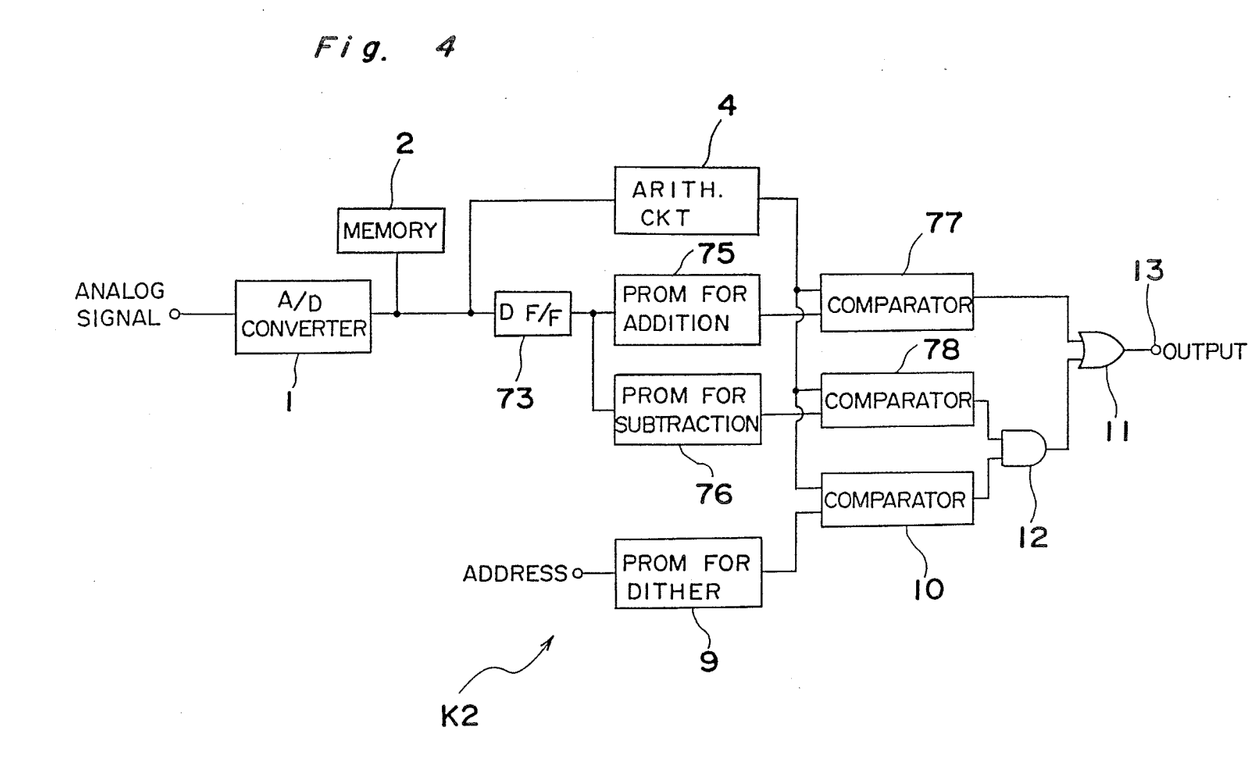
FIGS. 4 to 6 are views similar to FIG. 1, particularly showing second, third and fourth embodiments of the present invention, respectively.

Referring to FIG. 4, there is shown an image signal binary encoder K2 according to a second embodiment of the present invention. The image signal binary encoder K2 includes a memory 2 for storing digital data from the A/D converter 1 and a D flip-flop 73 for latching digital data of the point for binary conversion, which point is located in the image of the original document. Furthermore, the image signal binary encoder K2 includes a PROM 75 for addition, a PROM 76 for subtraction and comparators 77 and 78. When digital data of the point for binary conversion has been applied as address data from the D flip-flop 73 to the PROM 75 for addition, the PROM 75 for addition outputs a value obtained by adding a predetermined value to the digital data. Meanwhile, when the digital data of the point for binary conversion has been applied as address data from the D flip-flop 73 to the PROM 76 for subtraction, the PROM 76 for subtraction outputs a value obtained by subtracting a predetermined value from the digital data. The comparator 77 compares the average density outputted by the arithmetic circuit 4 with data outputted by the PROM 75 for addition and outputs "1" when the former is larger than the latter. Meanwhile, the comparator 78 compares the average density outputted by the arithmetic circuit 4 with data outputted by the PROM 76 for subtraction and outputs "0" and "1" when the former is smaller than and larger than the latter, respectively. The PROM 9 for dither uses 2 bits of given address data so as to select a dither type and uses the remaining 6 bits so as to select a point in an 8×8 dither pattern. The comparator 10 compares data outputted by the PROM 9 for dither with the average density from the arithmetic circuit 4 and outputs binary data obtained by converting the average density by dither method. An output of the comparator 77 is applied to the OR circuit 11. Outputs of the comparators 78 and 10 are applied to the AND circuit 12 whose output is, in turn, delivered to the OR circuit 11. An output of the OR circuit 11 is generated at the output terminal 13 of the image signal binary encoder K2.

When an average of densities of the periphery of the point for binary conversion is larger than a value obtained by adding a predetermined value to the density of the point for binary conversion, the comparator 77 outputs "1" and thus, an output at the output terminal 13 assumes "1". Meanwhile, when the average of densities of the periphery of the point for binary conversion is smaller than a value obtained by subtracting a predetermined value from the density of the point for binary conversion, the comparators 77 and 78 output "0" and thus, an output at the output terminal 13 assumes "0". Namely, in the case of an image of two gradations such as characters, in which a density of the point for binary conversion is vastly different from an average of densities of the periphery of the point for binary conversion, an output "1" or "0" is forcibly generated at the output terminal 13.

Meanwhile, when the average of densities of the periphery of the point for binary conversion is not only smaller than the value obtained by adding the predetermined value to the density of the point for binary conversion but larger than the value obtained by subtracting the predetermined value from the density of the point for binary conversion, the comparator 77 outputs "0" and the comparator 78 outputs "1". The binary data into which the average density is converted by dither method is outputted from the comparator 10 to the output terminal 13 through the AND circuit 12 and the OR circuit 11. Namely, in the case of an image of multiple gradations such as photographs, in which a density of the point for binary conversion is approximate to an average of densities of the periphery of the point for binary conversion, binary data corresponding to the average of densities of the periphery of the point for binary conversion is produced at the output terminal 13.

Figure 5:
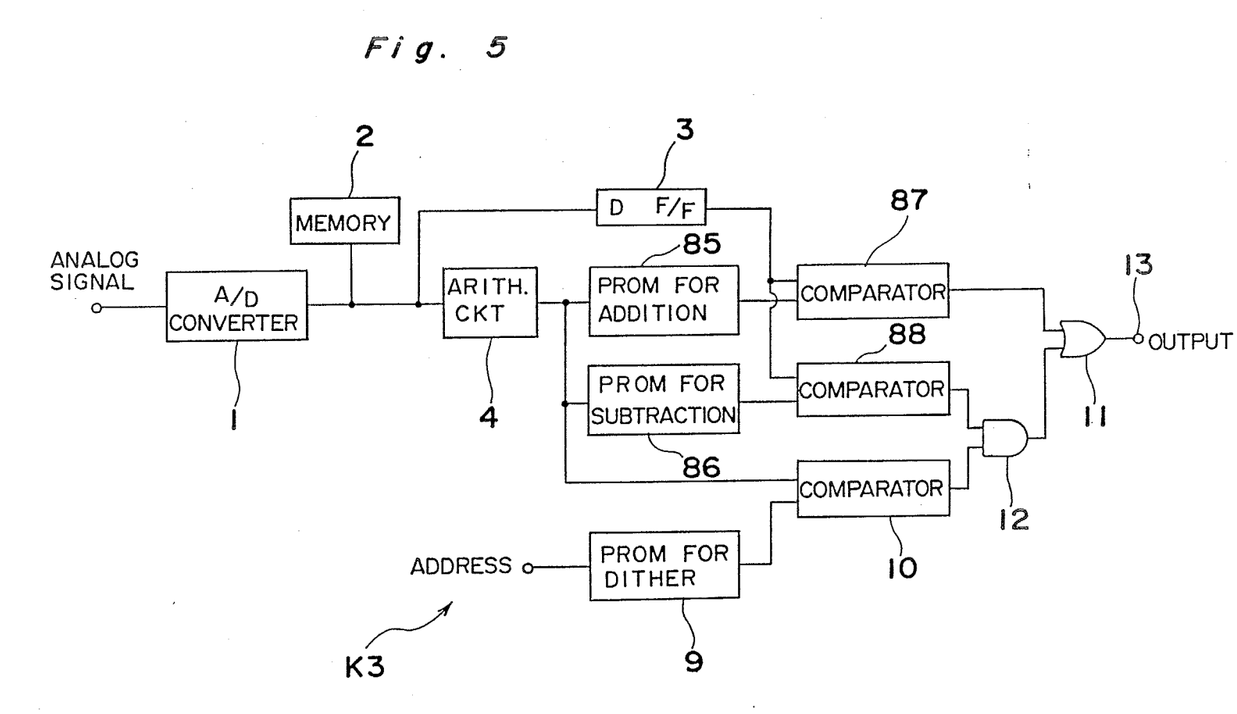

Referring to FIG. 5, there is shown an image signal binary encoder K3 according to a third embodiment of the present invention. The image signal binary encoder K3 includes a D flip-flop 3, a PROM 85 for addition, a PROM 86 for subtraction and comparators 87 and 88. When the average of densities is applied as address data from the arithmetic circuit 4 to the PROM 85 for addition, the PROM 85 for addition outputs a value obtained by subjecting the average to addition based on logarithm, i.e. a value obtained by multiplying the average by a preset value greater than 1 in the case where the average is smaller than a predetermined value. On the other hand, in the case where the average is larger than the predetermined value at this time, the PROM 85 for addition outputs "255". Meanwhile, when the average of densities is applied as address data from the arithmetic circuit 4 to the PROM 86 for subtraction, the PROM 86 for subtraction outputs a value obtained by subjecting the average to subtraction based on logarithm, i.e. a value obtained by multiplying the average by a preset value smaller than 1 in the case where the average is larger than a predetermined value. On the contrary, in the case where the average is smaller than the predetermined value at this time, the PROM 86 for subtraction outputs the predetermined value.

The comparator 87 compares data held by the D flip-flop 3 with data outputted by the PROM 85 for addition and outputs "1" and "0" when the former is larger than and smaller than the latter, respectively. Meanwhile, the comparator 88 compares the data of the D flip-flop 3 with data outputted by the PROM 86 for subtraction and outputs "0" and "1" when the former is smaller than and larger than the latter, respectively. The PROM 9 for dither uses 2 bits of given address data so as to select a dither type and uses the remaining 6 bits so as to select a point in an 8×8 dither pattern. The comparator 10 compares data outputted by the PROM 9 for dither with the average of densities from the arithmetic circuit 4 and outputs binary data obtained by converting the average density by dither method. An output of the comparator 87 is applied to the OR circuit 11. Outputs of the comparators 88 and 10 are applied to the AND circuit 12 whose output is, in turn, delivered to the OR circuit 11. An output of the OR circuit 11 is generated at the output terminal 13 of the image signal binary encoder K3.

When the density of the point for binary conversion is larger than a value obtained by adding a predetermined value to the average of densities of the periphery of the point for binary conversion, the comparator 87 outputs "1" and thus, an output at the output terminal 13 assumes "1". Meanwhile, when the density of the point for binary conversion is smaller than a value obtained by subtracting a predetermined value from the average of densities of the periphery of the point for binary conversion, the comparators 87 and 88 output "0" and thus, an output at the output terminal 13 assumes "0". Namely, in the case of an image of two gradations such as characters, in which a density of the point for binary conversion is widely different from an average of densities of the periphery of the point for binary conversion, an output "1" or "0" is forcibly produced at the output terminal 13.

Meanwhile, when the density of the point for binary conversion is not only smaller than the value obtained by adding the predetermined value to the average of densities of the periphery of the point for binary conversion but larger than the value obtained by subtracting the predetermined value from the average of densities of the periphery of the point for binary conversion, the comparator 87 outputs "0" and the comparator 88 outputs "1". The binary data into which the average density is converted by dither method is outputted from the comparator 10 to the output terminal 13 through the AND circuit 12 and the OR circuit 11. Namely, in the case of an image of multiple gradations such as photographs, in which a density of the point for binary conversion is approximate to an average of densities of the periphery of the point for binary conversion, binary data corresponding to the average of densities of the periphery of the point for binary conversion is generated at the output terminal 13.

Meanwhile, the PROM 85 for addition and the PROM 86 for subtraction can be modified as follows. Namely, in this modification, it is so arranged that when the average of densities is applied as address data from the arithmetic circuit 4 to the PROM 85 for addition, the PROM 85 for addition outputs a value obtained by adding a predetermined value to the average of densities. Furthermore, in this modification, it is so arranged that when the average of densities is applied as address data from the arithmetic circuit 4 to the PROM 86 for subtraction, the PROM 86 for subtraction outputs a value obtained by subtracting a predetermined value from the average of densities. When the density of the point for binary conversion is larger than the value obtained by adding the predetermined value to the average of densities of the periphery of the point for binary conversion, the comparator 87 output "1" and thus, an output at the output terminal 13 assumes "1". Meanwhile, when the density of the point for binary conversion is smaller than the value obtained by subtracting the predetermined value from the average of densities of the periphery of the point for binary conversion, the comparators 87 and 88 output "0" and thus, an output at the output terminal 13 assumes "0". Namely, in the case of an image of two gradations such as characters, in which a density of the point for binary conversion is quite different from an average of densities of the periphery of the point for binary conversion, an output "1" or "0" is forcibly produced at the output terminal 13. Meanwhile, when the average of the point for binary conversion is not only smaller than the value obtained by adding the predetermined value to the average of densities of the periphery of the point for binary conversion but larger than the value obtained by subtracting the predetermined value from the average of densities of the periphery of the point for binary conversion, the comparator 87 outputs "0" and the comparator 88 outputs "1". The binary data into which the average density is converted by dither method is outputted from the comparator 10 to the output terminal 13 through the AND circuit 12 and the OR circuit 11. Namely, in the case of an image of multiple gradations such as photographs, in which a density of the point for binary conversion is approximate to an average of densities of the periphery of the point for binary conversion, binary data corresponding to the average of densities of the periphery of the point for binary conversion is produced at the output terminal 13.

Figure 6:
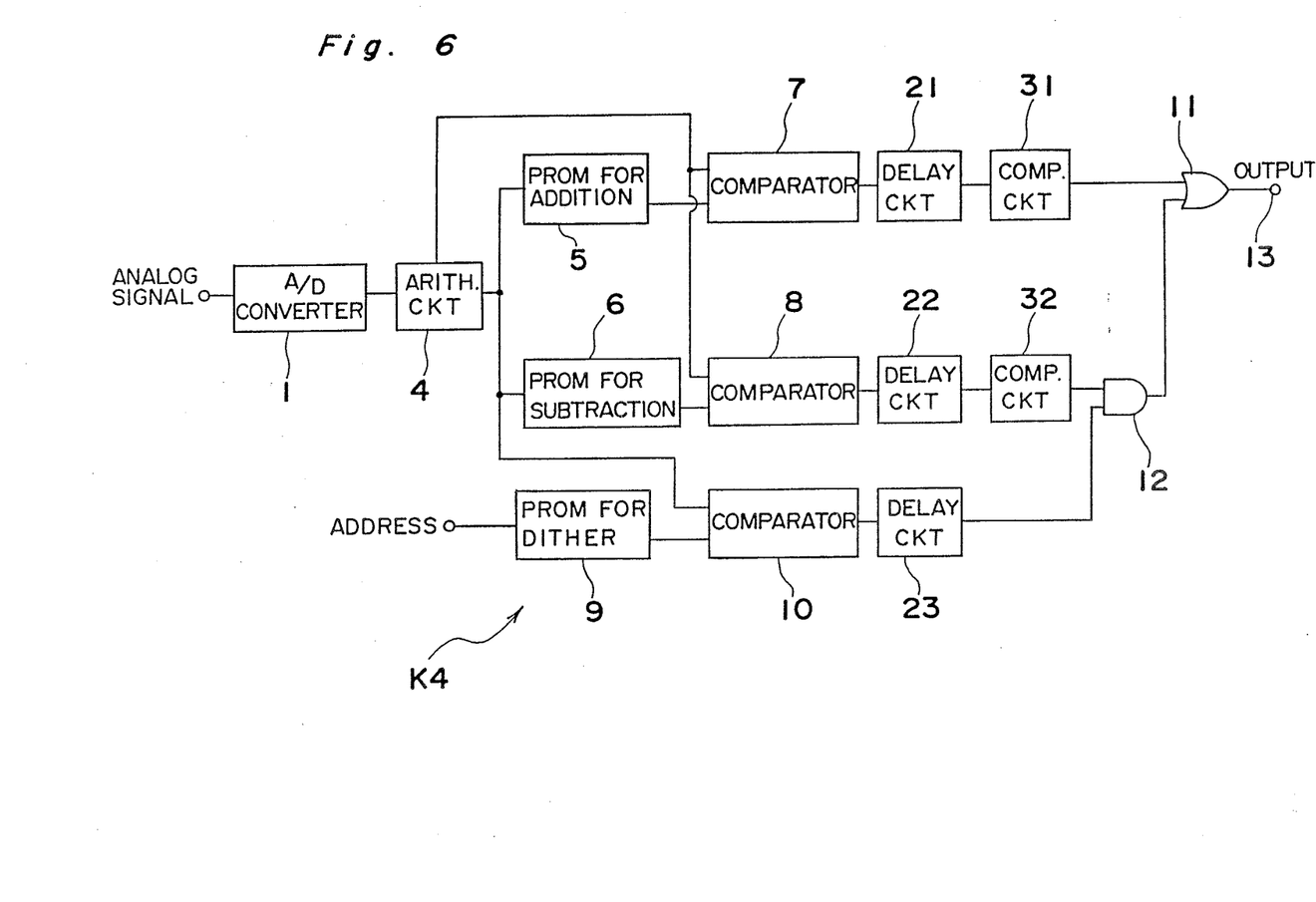

Referring finally to FIG. 6, there is shown an image signal binary encoder K4 according to a fourth embodiment of the present invention. The image signal binary encoder K4 includes delay circuits 21 to 23 and pattern comparison circuits 31 and 32. The delay circuit 21 delays output data of the comparator 7 and outputs data corresponding to a 3×3 area having the point for binary conversion as its center. In the output data of the delay circuit 21, when the output data of the central point of the 3×3 area is "1" and at least one of the output data of the peripheral 8 points of the 3×3 area is "1", the pattern comparison circuit 31 outputs "1". The delay circuit 22 delays output data of the comparator 8 and outputs data corresponding to a 3×3 area having the point for binary conversion as its center. In the output data of the delay circuit 22, when the output data of the central point of the 3×3 area is "0" and at least one of the output data of the peripheral 8 points is "0", the pattern comparison circuit 32 outputs "0". The delay circuit 23 delays an output of the comparator 10 and outputs data corresponding to the point for binary conversion.

An output of the pattern comparison circuit 31 is applied to the OR circuit 11. Outputs of the pattern comparison circuit 32 and the delay circuit 23 are transmitted to the AND circuit 12 whose output is, in turn, delivered to the OR circuit 11. An output of the OR circuit 11 is generated at the output terminal 13 of the image signal binary encoder K4.

When the density of the point for binary conversion is larger than the value obtained by adding the predetermined value to the average of densities of the periphery of the point for binary conversion, the comparator 7 outputs "1". When not only the comparator 7 but one of the peripheral 8 points outputs "1", the pattern comparison circuit 31 outputs "1" and thus, an output at the output terminal 13 assumes "1". Meanwhile, when the density of the point for binary conversion is smaller than a value obtained by subtracting a predetermined value from the average of densities of the periphery of the point for binary conversion, the comparators 7 and 8 output "0" and the pattern comparison circuit 31 also outputs "0". At this time, when not only the comparator 8 but one of the peripheral 8 points outputs "0", the pattern comparison circuit 32 outputs "0" and thus, an output at the output terminal 13 assumes "0". Namely, in the case of an image of two gradations such as photographs, in which a density of the point for binary conversion is vastly different from an average of densities of the periphery of the point for binary conversion, an output "1" or "0" is forcibly generated at the output terminal 13.

Furthermore, in the case where an output "1" or "0" is produced only at a single point, it becomes possible to obtain an image of two gradations having least noise through application of dither method by the pattern comparison circuits 31 and 32.

Meanwhile, when the density of the point for binary conversion is not only smaller than the value obtained by adding the predetermined value to the average of densities of the periphery of the point for binary conversion but larger than the value obtained by subtracting the predetermined value from the average of densities of the periphery of the point for binary conversion, the comparator 7 outputs "0" and the comparator 8 outputs "1". The binary data into which the average density is converted by dither method is outputted from the comparator 10 to the output terminal 13 through the delay circuit 23, the AND circuit 12 and the OR circuit 11. Namely, in the case of an image of multiple gradations such as photographs, in which a density of the point for binary conversion is approximate to an average of densities of the periphery of the point for binary conversion, binary data corresponding to the average of densities of the periphery of the point for binary conversion is generated at the output terminal 13.

In this fourth embodiment, the pattern comparison circuits 31 and 32 are arranged to cancel noise at a single point. However, according to an image, it can also be so arranged that an image having least noise is obtained by changing the pattern.

Furthermore, in this fourth embodiment, pattern comparison is performed in the 3×3 digital data. However, it can also be so arranged that comparison is performed in a larger pattern. In this case, effects of cancelling noise are enhanced further.

Meanwhile, in all the above described embodiments, the arithmetic circuit 4 is arranged to obtain the average of densities of the 8×8 area. It is to be noted that the arithmetic circuit 4 is not limited to the 8×8 area but is applicable to any square area by using this algorithm. Furthermore, in the above described embodiments, two adders and two subtracters are employed in the arithmetic circuit 4. However, if time sharing system is adopted, it is possible to use either only one adder or one adder and one subtracter in the arithmetic circuit 4.

As will be seen from the foregoing description, in accordance with the present invention, even if the number of digital data in the predetermined area becomes large, the arithmetic circuit for calculating the average density can be arranged without the need for increasing the number of the adders, thereby resulting in reduction of production cost of the image signal binary encoder. Furthermore, in accordance with the present invention, it becomes possible to calculate the average density on a real-time basis, i.e. through sequential data processing so as to convert analog image signals into binary output signals.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An apparatus for processing analog image data into image gradation data, said analog image data representative of a predetermined matrix area of M rows and N columns of image density data corresponding to image points of an original image, said predetermined matrix area centered at a conversion point, said apparatus comprising:
    analog/digital conversion means for converting said analog image data into digital image data;
    arithmetic means, coupled to said analog/digital conversion means, for determining an average image density of said predetermined area;
    comparison value generation means, coupled to said arithmetic means, for producing first and second comparison values indicative of black and white gradation thresholds based upon said average image density;
    dither generating means for providing a dither converted average density of said conversion point;
    comparison means for comparing image density data of said conversion point with said black gradation threshold, said white gradation threshold, and said dither converted average density, respectively, to provide comparison results; and
    gradation data output means, coupled to said comparison means, for outputting said image gradation data for said conversion point indicative of a black gradation, a white gradation, or said dither converted average density, said arithmetic means comprising
        first means, coupled to said analog/digital converter, for determining, in a sum of said image density data for each M row of said predetermined matrix area;
        second means, coupled to said first means, for determining an accumulated sum total of all M row sums; and
        dividing means, coupled to said second means, for dividing said accumulated sum total by M×N to provide said average image density.

2. The apparatus of claim 1 wherein said first means comprises:
    first delay means, coupled to said analog/digital converter, for outputting a first delayed signal;
    second delay means, coupled to said first delayed signal, for providing a second delayed signal;
    first subtractor means, coupled to said analog/digital converter and said second delayed signal, for subtracting said second delayed signal from said digital image signal to obtain a first subtracted output; and
    first adder means, coupled to said first subtracted output and to an output of a third delay means, said third delay means coupled to a first adder output of said first adder means, wherein said first adder means adds the first subtracted output to the first adder output delayed by said third delay means, and wherein said first adder output is said sum of said image density data for each M row.

3. The apparatus of claim 2 wherein said second means comprises:
    fourth delay means, coupled to said first adder output, for providing a fourth delayed signal;
    second subtractor means, coupled to said first adder output and said fourth delayed signal, for subtracting said fourth delayed signal from said first adder output to obtain a second subtracted output;

second adder means, coupled to said second subtractor output, for providing a second adder output; and latch means, coupled to said second adder output, for providing a latched output, wherein said latched output is provided as a further input to said second adder means and is said accumulated sum total of all M row sums.

4. The apparatus of claim 3 wherein said arithmetic means further comprises a fifth delay means, coupled to said first delayed signal, for outputting said conversion point image density data.

5. An apparatus for processing analog image data into image gradation data, said analog image data representative of a predetermined matrix area of M rows and N columns of image density data corresponding to image points of an original image, said predetermined matrix area centered at a conversion point, said apparatus comprising:

analog/digital conversion means for converting said analog image data into digital image data;

arithmetic means, coupled to said analog/digital conversion means, for determining an average image density of said predetermined area;

comparison value generation means, coupled to said arithmetic means, for producing first and second comparison values indicative of black and white gradation thresholds based upon said average image density;

dither generating means for providing a dither converted average density of said conversion point;

comparison means for comparing image density data of said conversion point with said black gradation threshold, said white gradation threshold, and said dither converted average density, respectively, to provide comparison results; and gradation data output means, coupled to said comparison means, for outputting said image gradation data for said conversion point indicative of a black gradation, a white gradation, or said dither converted average density, said arithmetic means comprising first means, coupled to said analog/digital converter, for determining a sum of said image density data for each M row of said predetermined matrix area, first dividing means, coupled to said first means, for dividing said sum of said image density data for each M row by N, second means, coupled to said first dividing means, for determining an accumulated sum total of all divided M row sums, and second dividing means, coupled to said second means, for dividing said accumulated sum total by M to provide said average image density.

6. The apparatus of claim 5 wherein said first means comprises:

first delay means, coupled to said analog/digital converter, for outputting a first delayed signal;

second delay means, coupled to said first delayed signal, for providing a second delayed signal;

first substrate means, coupled to said analog/digital converter and said second delayed signal, for subtracting said second delayed signal from said digital image signal to obtain a first subtracted output; and first adder means, coupled to said first subtracted output and to an output of a third delay means, said third delay means coupled to a first adder output of said first adder means, wherein said first adder means adds the first subtracted output to the first adder output delayed by said third delay means, and wherein said first adder output is said sum of said image density data for each M row.

7. The apparatus of claim 6 wherein said second means comprises:

fourth delay means, coupled to said first divider means, for providing a fourth delayed signal;

second subtractor means, coupled to said first divider means and said fourth delayed signal, for subtracting said fourth delayed signal from said first adder output to obtain a second subtracted output;

second adder means, coupled to said second subtractor output, for providing a second adder output; and latch means, coupled to said second adder output, for providing a latched output; wherein said latched output is provided as a further input to said second adder means and is said accumulated sum total of M row sums.

8. The apparatus of claim 7 wherein said arithmetic means further comprises a fifth delay means, coupled to said first delayed signal, for outputting said conversion point image density data.

9. A method for processing analog image data representative of an original image into image gradation data, said analog image data representative of a predetermined matrix area of M rows and N column of image density data corresponding to image points of said original image, said predetermined matrix area centered at a conversion point, said method comprising the steps of:

converting said analog image data into digital image data;

determining from said digital image data an average image density of said predetermined area by
determining a sum of said image density data for each M row of said predetermined matrix area,
determining an accumulated sum total of all M row sums, and
dividing said accumulated sum total by M×N to obtain said average image density;

generating first and second comparison values indicative of black and white gradation thresholds based upon said average image density;

generating a dither converted average density of said conversion point; and comparing image density data of said conversion point with said black gradation threshold, said white gradation threshold, and said dither converted average density, respectively, to provide comparison results indicating whether said image density data of said conversion point is greater than said black gradation threshold, less than said white gradation threshold, or between said white and black gradation thresholds in order to respectively provide as an output a signal indicative of black gradation, white gradation, or said dither converted average density to thereby process said original image into image gradation data.

10. A method for processing analog image data representative of an original image into image gradation data, said analog image data representative of a predetermined matrix area of M rows and N columns of image density data corresponding to image points of said original image, said predetermined matrix area centered at a conversion point, said method comprising the steps of:

converting said analog image data into digital image data;

determining from said digital image data an average image density of said predetermined area by determining a sum of said image density data for each M row of said predetermined matrix area, dividing said sum of said image density data for each M row by N, determining an accumulated sum total of all divided M row sums, and dividing said accumulated sum total by M to obtain said average image density;

generating first and second comparison values indicative of black and white gradation thresholds based upon said average image density;

generating a dither converted average density of said conversion point; and comparing image density data of said conversion point with said black gradation threshold, said white gradation threshold, and said dither converted average density, respectively, to provide comparison results indicating whether said image density data of said conversion point is greater than said black gradation threshold, less than said white gradation threshold, or between said white and black gradation thresholds in order to respectively provide as an output a signal indicative of black gradation, white gradation, or said dither converted average density to thereby process said original image into image gradation data.

* * * * *